US005690458A

United States Patent [19]

Junkers

[11] Patent Number: 5,690,458

[45] Date of Patent: Nov. 25, 1997

[54] HYDRAULIC BOLT TENSIONER

[75] Inventor: John K. Junkers, 7 Arrowhead La., Saddle River, N.J. 07540

[73] Assignee: John K. Junkers, Saddle River, N.J.

[21] Appl. No.: 642,623

[22] Filed: May 3, 1996

Related U.S. Application Data

[63] Continuation-in-part of Ser. No. 489,896, Jun. 13, 1995, abandoned.

[51] Int. Cl.[6] ........................ F16B 37/08

[52] U.S. Cl. ........................ 411/432; 411/434; 411/917

[58] Field of Search ........................ 411/432, 434, 411/916, 917, 427

[56] References Cited

U.S. PATENT DOCUMENTS

| | | | |
|---|---|---|---|
| 2,571,265 | 10/1951 | Leufven | 411/917 X |
| 3,424,080 | 1/1969 | Pappas | 411/434 X |
| 3,962,950 | 6/1976 | Piroska | 411/434 |
| 4,182,215 | 1/1980 | Green et al. | 411/434 |
| 5,046,906 | 9/1991 | Bucknell | 411/917 X |
| 5,468,106 | 11/1995 | Percival-Smith | 411/917 X |

*Primary Examiner*—Neill R. Wilson
*Attorney, Agent, or Firm*—Michael J. Striker

[57] ABSTRACT

A hydraulic bolt tensioner having a first chamber and a second chamber, a first hollow piston movable in the first chamber and partially extending into the second chamber, a second piston displaceable inside the first piston and movable in the second chamber, the second piston having connecting means for connecting with an end of a bolt, and a hydraulic fluid supply into the first chamber so that when hydraulic fluid pressure is applied to the first chamber, the first piston moves so that the first piston displaces the hydraulic fluid in the second chamber and moves the second piston to pull the end of the bolt.

6 Claims, 2 Drawing Sheets

HYDRAULIC BOLT TENSIONER

CROSS-REFERENCE TO A RELATED APPLICATION

This application is a continuation-in-part of application Ser. No.: 08/489,896 filed on Jun. 13, 1995, now abandoned.

BACKGROUND OF THE INVENTION

The present invention relates generally to hydraulic tools for tightening threaded connectors, or in other words to hydraulic tensioners.

Hydraulic tensioners are widely known and utilized. It is desirable to design such a hydraulic tensioner which has a lower power consumption. In connection with this a hydraulic tensioner was proposed in U.S. Pat. No. 5,398,574. The tool disclosed in this patent application has a bolt pulling means which includes an engaging element arranged to engage the end of the bolt, and the fluid operated means formed by a plurality of cylinders arranged on top of one another along the axis of the engaging element and having cylinder chambers, and a plurality of pistons axially movable in the cylinder chambers. The cylinder chambers and the pistons movable in them are coextensive and substantially identical. The pistons simultaneously apply a pulling force to the same engaging element which pulls the bolt and a higher pulling force is generated with a predetermined power consumption from the hydraulic source or the same force applied for pulling the bolt is produced with a lower power consumption of the hydraulic source. The engaging element pulls the bolt, and additional fluid-operated means turn the nut down when the bolt is pulled to a desired load.

The bolt tensioner disclosed in this application has however the disadvantage that in order to keep its diameter small, several cylinder stages are required which in turn make the bolt tensioner substantially high. While in some applications the height is not important, there are other applications where the overhead clearance is limited so that the above described tensioner cannot be used.

A single stage tensioner which is disclosed in another U.S. patent application is much lower; however, it has a much larger radius so that it might not fit when size-clearances are limited.

SUMMARY OF THE INVENTION

It is therefore an object of the present invention to provide a hydraulic bolt tensioner, which avoids the disadvantages of the prior art.

In keeping with these objects and with others which will become apparent hereinafter, one feature of the present invention resides, briefly stated, in a hydraulic bolt tensioner, which has means forming a primary chamber and a secondary chamber; a first hollow piston displaceable in the primary chamber and having a portion extending into the secondary chamber; and a second piston provided with connecting means for connecting to a bolt end and displaceable in the secondary chamber, so that when hydraulic fluid pressure is applied to the primary chamber the first piston moves so as to displace the hydraulic fluid in the secondary chamber and to move the second piston to thereby pull an end of the bolt.

When the tool is designed in accordance with the present invention, it avoids the disadvantages of the prior art and provides for the highly advantageous results.

When the hydraulic bolt tensioner is designed in accordance with the present invention, with the use of a regular industrial hydraulic pump which usually provides the maximum pressure of 10,000 psi, three times the pressure can be developed in an independent chamber which is connected to the bolt tensioner. The height of the tool is reduced by 50% and the diameter of the tool is equivalent to the diameter of the tool disclosed in the above mentioned U.S. patent application 5,398,574.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
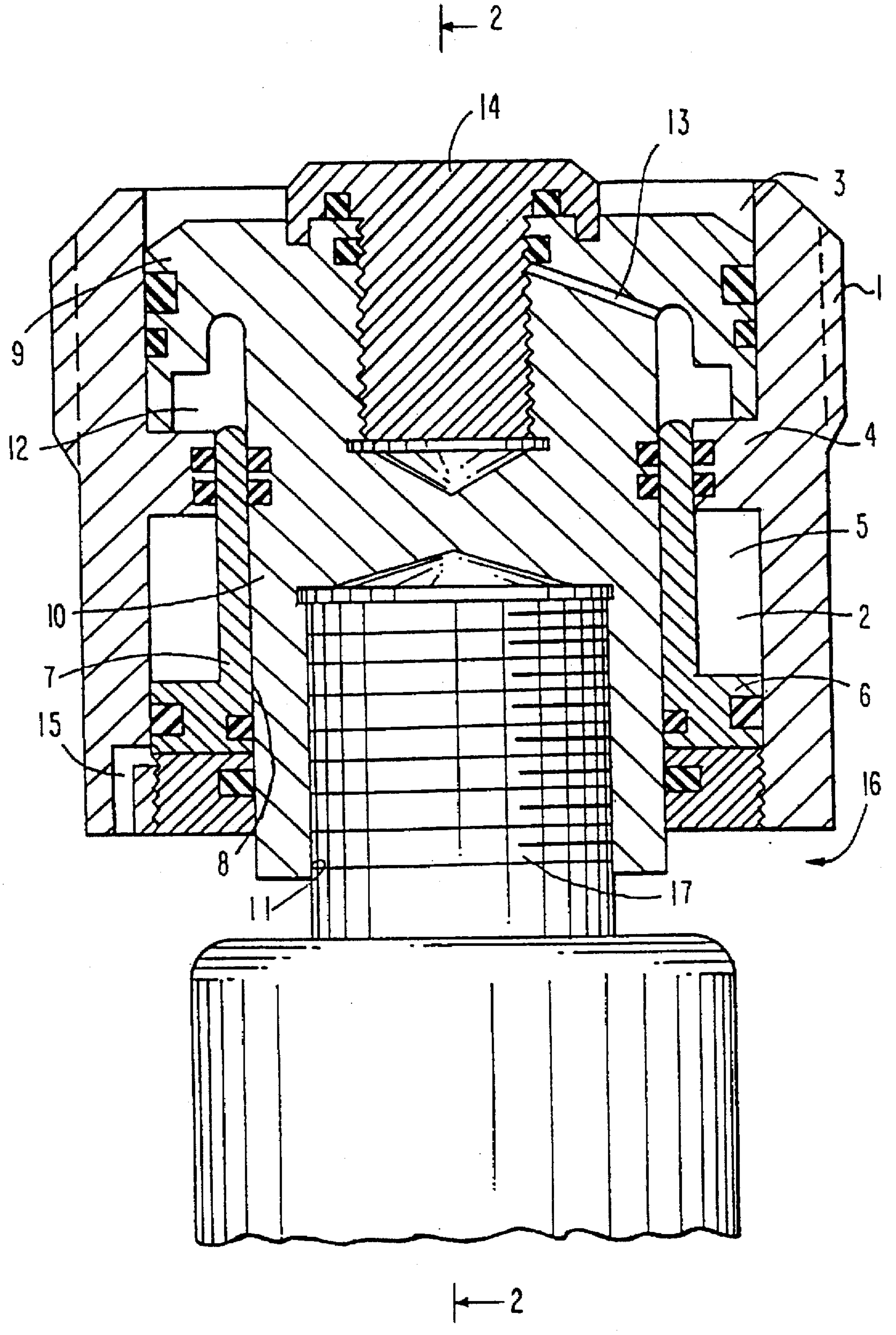
FIG. 1 of the drawings is a view showing a hydraulic bolt tensioner in accordance with the present invention.

A hydraulic bolt tensioner in accordance with the present invention has a housing which is identified as a whole with reference numeral 1. The housing 1 is hollow and has a stepped inner opening with a first opening portion 2 and a second opening portion 3 separated from one another by an inwardly projecting partition 4.

A first substantially cylindrical hydraulic chamber 5 is formed in the region of the opening portion 2. First piston means cooperate with the first hydraulic chamber 5 and include a first piston 6 which is axially displaceable in the first chamber 5 in an axial direction, and an elongated piston rod 7 extending in the axial direction. The first piston means 6, 7 are hollow and have an inner opening 8. Second piston means include a piston 9 which is axially displaceable in the opening portion 3 and an elongated piston rod 10 extending in the axial direction and axially displaceable in the opening 8 of the first piston means.

The second piston means, or in particular the piston rod 10 of the second piston 9, has a central opening 11 provided with a thread for engaging with a thread of a bolt to be tensioned. A second substantially cylindrical hydraulic chamber 12 is formed substantially between the first piston means and the second piston means. As can be seen from the drawings, the second hydraulic chamber is formed between the piston rod 7 of the first piston means 6, 7 and the piston 9 of the second piston means 9, 10.

The second cylinder chamber 12 is filled with oil through passages 13 which after filling can be closed by a filler bolt 14. During operation a hydraulic fluid is supplied from a hydraulic source, for example from a regular industrial hydraulic pump, through a supply passage 15. A nut turning portion of the tool is identified as a whole with reference numeral 16 and operates for turning the nut applied on the bolt. The nut turning portion 16 can be formed completely identically to the nut portion disclosed in U.S. Pat. No. 5,398,574 or in any other way.

Figure 2:
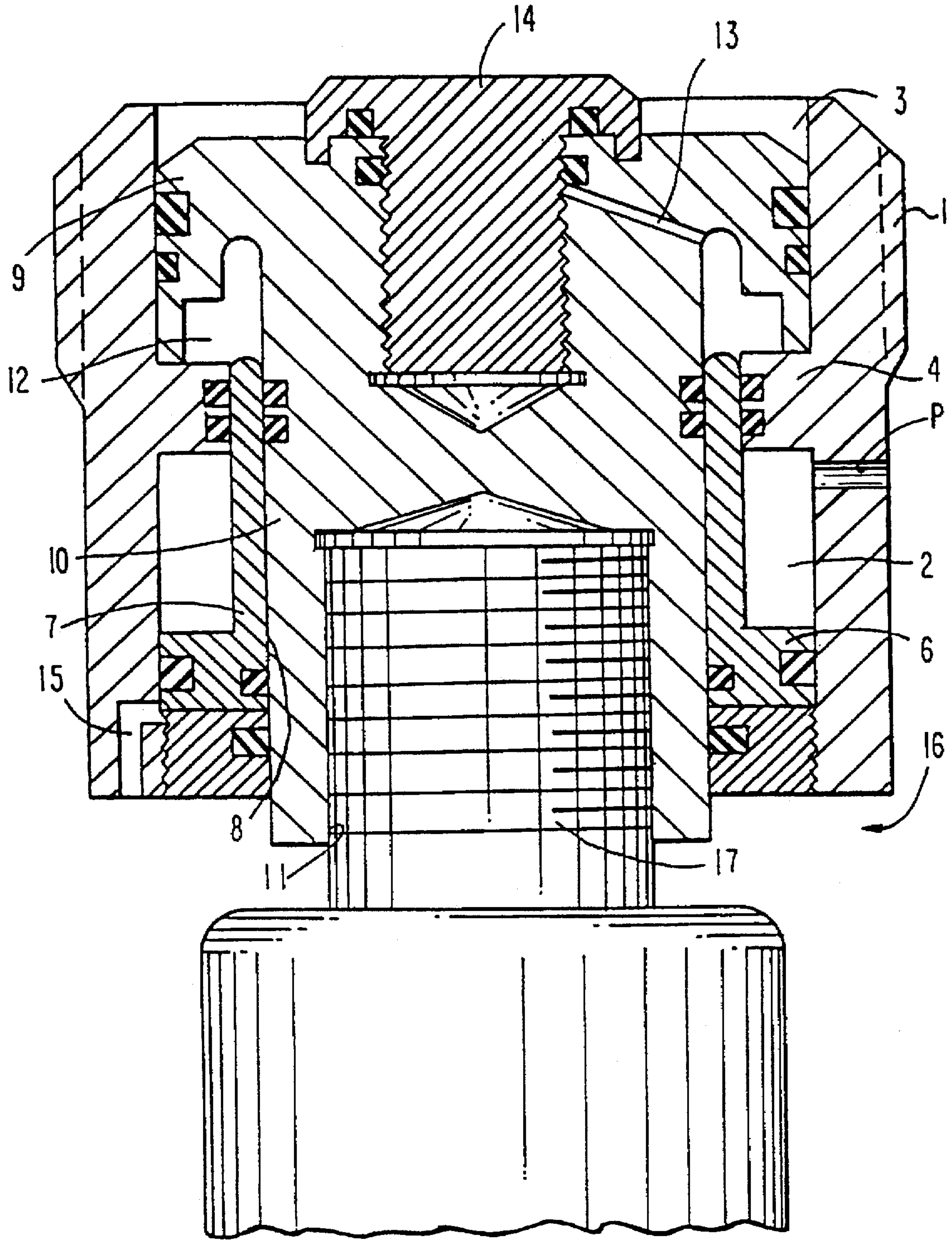
FIG. 2 of the drawings is a view showing a section of a hydraulic bolt tensioner of FIG. 1 taken along the line 2—2.

The tool in accordance with the present invention operates in the following manner:

When the hydraulic fluid is supplied from the hydraulic fluid source through the supply passage is the first piston 6 is displaced and its hollow piston rod 7 displaces the hydraulic fluid in the secondary chamber 12. Thereby the second piston 9 with the piston rod 10 is displaced and pulls the end of a bolt 17. During the displacement of the first piston 6 the hydraulic liquid is discharged from the hydraulic chamber 5 through a discharge passage P shown in FIG. 2.

It will be understood that each of the elements described above, or two or more together, may also find a useful application in other types of constructions differing from the types described above.

While the invention has been illustrated and described as embodied in a hydraulic bolt tensioner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic bolt tensioner, comprising means forming a first chamber and a second chamber; first hollow piston means movable in said first chamber and partially extending into said second chamber; second piston means displaceable inside said first piston means and movable in said second chamber, said second piston means having connecting means for connecting with an end of a bolt; and means for supplying hydraulic fluid into said first chamber so that when hydraulic fluid pressure is applied to said first chamber, said first piston means moves so that said first piston means displaces the hydraulic fluid in said second chamber and moves said second piston to pull the end of the bolt.

2. A hydraulic bolt tensioner as defined in claim 1, wherein said first chamber has an area to which the pressure of hydraulic fluid is applied and which is greater than an area of said second chamber to which the pressure of the hydraulic fluid is applied.

3. A hydraulic bolt tensioner as defined in claim 1, wherein said first piston means include a piston movable in said first chamber, and a piston rod extending from said piston into said second chamber.

4. A hydraulic bolt tensioner as defined in claim 1, wherein said second piston means includes a piston movable in said second chamber and a piston rod extending from said piston and provided with said connecting means.

5. A hydraulic bolt tensioner as defined in claim 1, wherein said second chamber is formed substantially between said first piston means and said second piston means.

6. A hydraulic bolt tensioner as defined in claim 5; and further comprising a housing, said first chamber being formed between said housing and said first piston means.

* * * * *